United States Patent
Heyerman

(10) Patent No.: US 11,542,819 B2
(45) Date of Patent: Jan. 3, 2023

(54) SPLIT RING SEAL FOR GAS TURBINE ENGINE ROTOR

(71) Applicant: PRATT & WHITNEY CANADA CORP., Longueuil (CA)

(72) Inventor: Jeffrey Bernard Heyerman, Oakville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/177,585

(22) Filed: Feb. 17, 2021

(65) Prior Publication Data
US 2022/0259975 A1 Aug. 18, 2022

(51) Int. Cl.
*F01D 11/00* (2006.01)
*F01D 5/02* (2006.01)
*F16J 15/3272* (2016.01)
*F16J 9/14* (2006.01)
(Continued)

(52) U.S. Cl.
CPC ............ *F01D 5/025* (2013.01); *F01D 11/006* (2013.01); *F01D 5/066* (2013.01); *F01D 11/003* (2013.01); *F01D 11/005* (2013.01); *F05D 2220/32* (2013.01); *F05D 2240/24* (2013.01); *F05D 2240/55* (2013.01); *F16J 9/14* (2013.01);
(Continued)

(58) Field of Classification Search
CPC .......... F01D 5/025; F01D 5/026; F01D 5/066; F01D 11/003; F01D 11/005; F05D 2240/58; F05D 2240/581; F16J 15/441; F16J 15/442; F16J 15/3272
See application file for complete search history.

(56) References Cited

U.S. PATENT DOCUMENTS

| 1,532,938 | A | * | 4/1925 | Peeler | ........................ | F16J 9/20 |
| | | | | | | 277/496 |
| 2,068,042 | A | * | 1/1937 | Teetor | ........................ | F16J 9/20 |
| | | | | | | 277/466 |

(Continued)

FOREIGN PATENT DOCUMENTS

WO WO-2021024697 A1 * 2/2021

OTHER PUBLICATIONS

WO2021024697—Translation from Espacenet (Year: 2021).*

*Primary Examiner* — Richard A Edgar
*Assistant Examiner* — Behnoush Haghighian
(74) *Attorney, Agent, or Firm* — Norton Rose Fulbright Canada LLP

(57) ABSTRACT

A gas turbine engine rotor assembly, comprising: a shaft about an axis having an outer surface radially outward and a groove radially into the outer surface; a disc surrounding the shaft rotatable with the shaft about the axis, the disc having an inner surface extending axially defining an inner diameter, having a disc profile around the groove and axially away from and radially inwardly of the inner diameter, the shaft and the disc defining a gap circumscribed outwardly by the inner diameter and inwardly by the outer surface; and a seal including a split ring fitted into the groove and rotatable with the shaft about the axis, the ring having a ring profile complementary to the disc profile, the ring resiliently expandable radially in the gap to the inner diameter, the disc profile cooperable with the ring profile to axially load the shaft via the ring expanded across the gap.

18 Claims, 6 Drawing Sheets

(51) Int. Cl.
*F16J 15/44* (2006.01)
*F01D 5/06* (2006.01)

(52) U.S. Cl.
CPC .......... *F16J 15/3272* (2013.01); *F16J 15/441* (2013.01); *F16J 15/442* (2013.01)

(56) References Cited

U.S. PATENT DOCUMENTS

| | | | | |
|---|---|---|---|---|
| 2,386,873 A * | 10/1945 | Mercier | ................ | F16J 15/166 277/587 |
| 2,883,212 A * | 4/1959 | Laser | ................ | F16J 15/441 277/410 |
| 3,001,806 A * | 9/1961 | Macks | ................ | F16J 15/441 415/230 |
| 3,124,502 A * | 3/1964 | Radke | ................ | F16J 15/20 428/378 |
| 4,211,424 A * | 7/1980 | Stein | ................ | F16J 15/54 277/400 |
| 4,526,387 A * | 7/1985 | Flower | ................ | F01D 11/00 277/422 |
| 4,750,746 A * | 6/1988 | Boudot | ................ | F16J 15/184 415/230 |
| 4,915,589 A * | 4/1990 | Gessler | ................ | F01D 5/025 415/217.1 |
| 5,002,288 A * | 3/1991 | Morrison | ................ | F16J 15/46 277/413 |
| 5,344,162 A * | 9/1994 | Kernon | ................ | F16J 15/164 277/579 |
| 5,660,398 A * | 8/1997 | Terao | ................ | F16J 15/3272 92/162 R |
| 5,713,578 A * | 2/1998 | Terao | ................ | F16L 27/087 277/582 |
| 5,934,680 A * | 8/1999 | Kakehi | ................ | F16J 9/14 277/499 |
| 6,431,550 B1 * | 8/2002 | Tong | ................ | F16J 15/442 277/346 |
| 6,705,616 B2 * | 3/2004 | Fujii | ................ | F16J 9/06 277/467 |
| 7,198,303 B2 * | 4/2007 | Brophy, III | ................ | F16L 23/036 285/271 |
| 7,258,529 B2 * | 8/2007 | Wagner | ................ | F01D 5/3015 416/220 R |
| 7,291,947 B2 * | 11/2007 | Hashiba | ................ | H02K 5/124 310/90 |
| 7,320,468 B2 * | 1/2008 | Morgan | ................ | F16J 15/443 277/400 |
| 7,334,980 B2 * | 2/2008 | Trinks | ................ | F01D 9/04 415/230 |
| 7,510,380 B2 * | 3/2009 | Alam | ................ | F01D 5/027 416/244 R |
| 8,205,891 B2 * | 6/2012 | Vasagar | ................ | F16J 15/441 277/579 |
| 8,245,398 B2 * | 8/2012 | Fukushima | ....... | B29C 66/91411 29/402.21 |
| 8,246,255 B2 * | 8/2012 | Raberin | ................ | F16C 35/073 384/539 |
| 8,328,245 B2 * | 12/2012 | Gayer | ................ | B01J 3/002 285/364 |
| 8,491,267 B2 * | 7/2013 | Glasspoole | ............ | F01D 5/025 416/221 |
| 8,932,022 B2 * | 1/2015 | Ivakitch | ................ | F01D 5/025 416/204 R |
| 8,939,710 B2 * | 1/2015 | Webb | ................ | F01D 11/005 415/113 |
| 9,004,495 B2 * | 4/2015 | Vasagar | ................ | F16J 15/441 277/579 |
| 9,157,530 B2 * | 10/2015 | Seki | ................ | F16J 15/181 |
| 9,267,441 B1 * | 2/2016 | Ellwood, III | ............ | F16J 15/24 |
| 9,309,973 B2 * | 4/2016 | Seki | ................ | F16J 15/181 |
| 9,388,705 B2 * | 7/2016 | Seki | ................ | F01D 11/003 |
| 9,399,926 B2 * | 7/2016 | Wiebe | ................ | F02C 7/28 |
| 9,423,028 B2 * | 8/2016 | Miller | ................ | F16J 9/14 |
| 9,546,734 B2 * | 1/2017 | Cid | ................ | F16J 15/3488 |
| 10,012,313 B2 * | 7/2018 | Allen | ................ | F16J 15/061 |
| 10,012,314 B2 * | 7/2018 | Becker | ................ | F16J 15/3236 |
| 10,138,741 B2 * | 11/2018 | Littler | ................ | F01D 5/326 |
| 10,619,742 B2 * | 4/2020 | Miller | ................ | F16J 15/441 |
| 10,655,632 B2 * | 5/2020 | Kawai | ................ | F04D 29/106 |
| 10,895,323 B2 * | 1/2021 | Hirano | ................ | F16J 15/40 |
| 10,907,476 B2 * | 2/2021 | Cooper | ................ | F02K 3/06 |
| 10,989,058 B2 * | 4/2021 | Trivedi | ................ | F16J 15/3272 |
| 11,028,713 B2 * | 6/2021 | Webb | ................ | F16J 15/3208 |
| 11,085,315 B2 * | 8/2021 | Gallier | ................ | F16J 15/164 |
| 11,143,306 B1 * | 10/2021 | Hunter | ................ | B02C 2/04 |
| 11,149,854 B2 * | 10/2021 | Stoyanov | ............ | F01D 11/005 |
| 11,162,591 B2 * | 11/2021 | Martin | ................ | H02K 5/124 |
| 11,231,042 B2 * | 1/2022 | Werdecker | ............ | F01D 11/003 |
| 2002/0117807 A1 * | 8/2002 | Yoshida | ................ | F16J 15/441 277/412 |
| 2005/0242519 A1 * | 11/2005 | Koleilat | ................ | E21B 33/03 277/434 |
| 2006/0216143 A1 * | 9/2006 | Trinks | ................ | F01D 25/246 415/173.1 |
| 2008/0025855 A1 * | 1/2008 | Alaze | ................ | F04B 53/143 277/497 |
| 2008/0252019 A1 * | 10/2008 | Yu | ................ | F16J 9/206 277/434 |
| 2010/0066027 A1 * | 3/2010 | Vasagar | ................ | F16J 15/441 277/350 |
| 2012/0091666 A1 * | 4/2012 | Chelaidite | ............ | F16J 15/3272 277/587 |
| 2012/0112415 A1 * | 5/2012 | Benjamin | ............ | F16J 15/3272 277/303 |
| 2012/0261887 A1 * | 10/2012 | Vasagar | ................ | F16J 15/441 277/543 |
| 2013/0051993 A1 * | 2/2013 | Webb | ................ | F16J 15/164 415/173.7 |
| 2014/0035240 A1 * | 2/2014 | Sha | ................ | F01D 11/003 277/641 |
| 2014/0265157 A1 * | 9/2014 | Mukai | ................ | F16L 5/08 277/606 |
| 2015/0048574 A1 * | 2/2015 | Seki | ................ | F16J 15/181 277/589 |
| 2015/0056068 A1 * | 2/2015 | Wiebe | ................ | F01D 11/003 415/173.1 |
| 2015/0108720 A1 * | 4/2015 | Seki | ................ | F16J 15/18 277/514 |
| 2015/0204204 A1 * | 7/2015 | Seki | ................ | F16J 15/18 415/230 |
| 2017/0191371 A1 * | 7/2017 | Dungs | ................ | F01D 11/006 |
| 2019/0323370 A1 * | 10/2019 | Trivedi | ................ | F16J 15/3272 |
| 2020/0056506 A1 * | 2/2020 | Stoyanov | ................ | F02C 7/28 |
| 2020/0256467 A1 * | 8/2020 | Stoyanov | ................ | F16J 15/162 |
| 2020/0318489 A1 * | 10/2020 | Webb | ................ | F16J 15/3208 |
| 2020/0392857 A1 * | 12/2020 | Schroder | ................ | F01D 5/066 |

\* cited by examiner

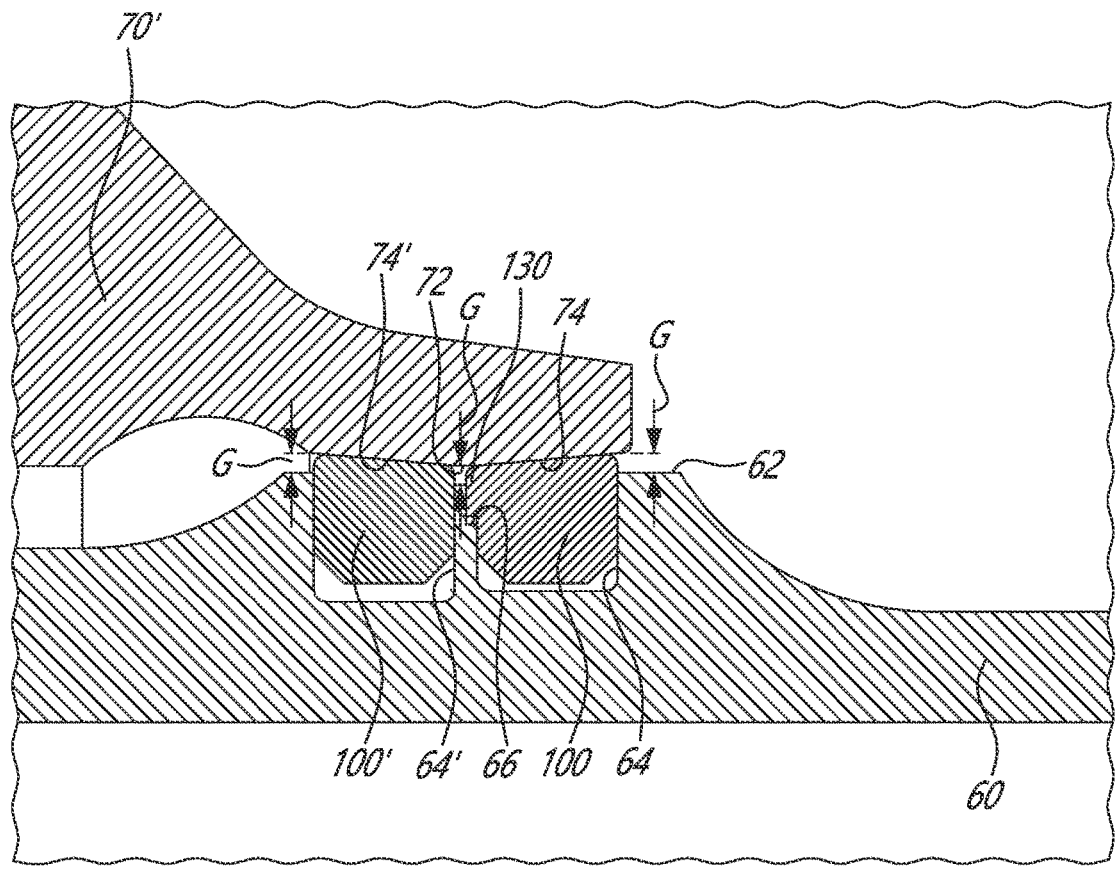

US 11,542,819 B2

SPLIT RING SEAL FOR GAS TURBINE ENGINE ROTOR

TECHNICAL FIELD

The application relates generally to gas turbine engine rotors and, more particularly, to seals for gas turbine engine rotors.

BACKGROUND OF THE ART

In gas turbine engines, stationary and rotary engine components are arranged to define flow paths in which working fluids, for example hot, expanding combustion gases and generally cooler, compressed air, are processed for the engine to operate. Due to the high-pressure, high-temperature conditions in play, flow path-defining engine components are commonly affected by dimensional variations, which may result in modifications in flow path geometry having an impact on engine performance. The effects of such dimensional variations may be exacerbated as they occur to rotary components, which may vibrate in presence of non axisymmetric deformation. Ad hoc structural means for managing flows of working fluid that are routed in and around rotary components of the engines may be opportune.

SUMMARY

In an aspect of the present technology, there is provided a gas turbine engine rotor assembly, comprising: a shaft rotatable about an axis, the shaft having an outer shaft surface radially outward relative to the axis and a shaft groove radially into the outer shaft surface; a disc surrounding the shaft and rotatable with the shaft about the axis, the disc having an inner disc surface extending axially and defining an inner disc diameter at an axial location of the inner disc surface, the inner disc surface having a disc tapering profile extending circumferentially around the shaft groove and axially away from and radially inwardly of the inner disc diameter, the shaft and the disc together defining a gap circumscribed outwardly by the inner disc diameter and inwardly by the outer shaft surface; and a seal including a split ring fitted into the shaft groove and rotatable with the shaft about the axis, the split ring having an outer ring surface having a ring tapering profile complementary to the disc tapering profile, the split ring resiliently expandable radially in the gap to the inner disc diameter, the disc tapering profile cooperable with the ring tapering profile to axially load the shaft via the split ring upon the split ring being expanded across the gap.

In another aspect of the present technology, there is provided a seal for a gas turbine engine rotor disc, comprising: a split ring including a pair of mutually overlapped end portions together defining a split joint and an arcuate portion extending circumferentially about an axis from a first end of the end portions to a second end of the end portions, the arcuate portion having: first and second sides facing axially away from one another relative to the axis; an outer ring surface joining the first and second sides, the outer ring surface having a frustoconical shape circumscribed by a first peripheral edge proximate to the first side and by a second peripheral edge proximate to the second side, the second peripheral edge being longer than the first peripheral edge; an inner ring surface radially inward relative to the axis and extending axially between the first and second sides, and a channel defined into the inner ring surface at a location diametrically opposite to the split joint, the channel extending axially through the arcuate portion; the split ring resiliently expandable radially outwardly under centrifugal force relative to the axis to distance the end portions such that the first and second peripheral edges conform to a frustoconical shape of the gas turbine engine rotor disc.

In yet another aspect of the present technology, there is provided a gas turbine engine, comprising: a shaft rotatable about an axis, the shaft having an outer shaft surface radially outward relative to the axis and a shaft groove radially into the outer shaft surface; a disc surrounding the shaft and rotatable with the shaft about the axis, the disc having an inner disc surface extending axially and defining an inner disc diameter at an axial location of the inner disc surface, the inner disc surface having a ramped disc profile extending circumferentially around the shaft groove and axially away from and radially inwardly of the inner disc diameter, the shaft and the disc together defining a gap circumscribed outwardly by the inner disc diameter and inwardly by the outer shaft surface; and a seal including a split ring fitted into the shaft groove and rotatable with the shaft about the axis, the split ring having an outer ring surface having a ramped ring profile complementary to the ramped disc profile, the split ring resiliently expandable radially in the gap to the inner disc diameter, the ramped disc profile cooperable with the ramped ring profile to axially load the shaft via the split ring upon the split ring being expanded across the gap.

DESCRIPTION OF THE DRAWINGS

Reference is now made to the accompanying figures in which:

FIG. 8 is a partial cross-sectional view of an alternate implementation of the rotor of FIG. 3 including a shaft fitted with two seals corresponding to alternate implementations of the seal of FIG. 4.

DETAILED DESCRIPTION

Figure 1:
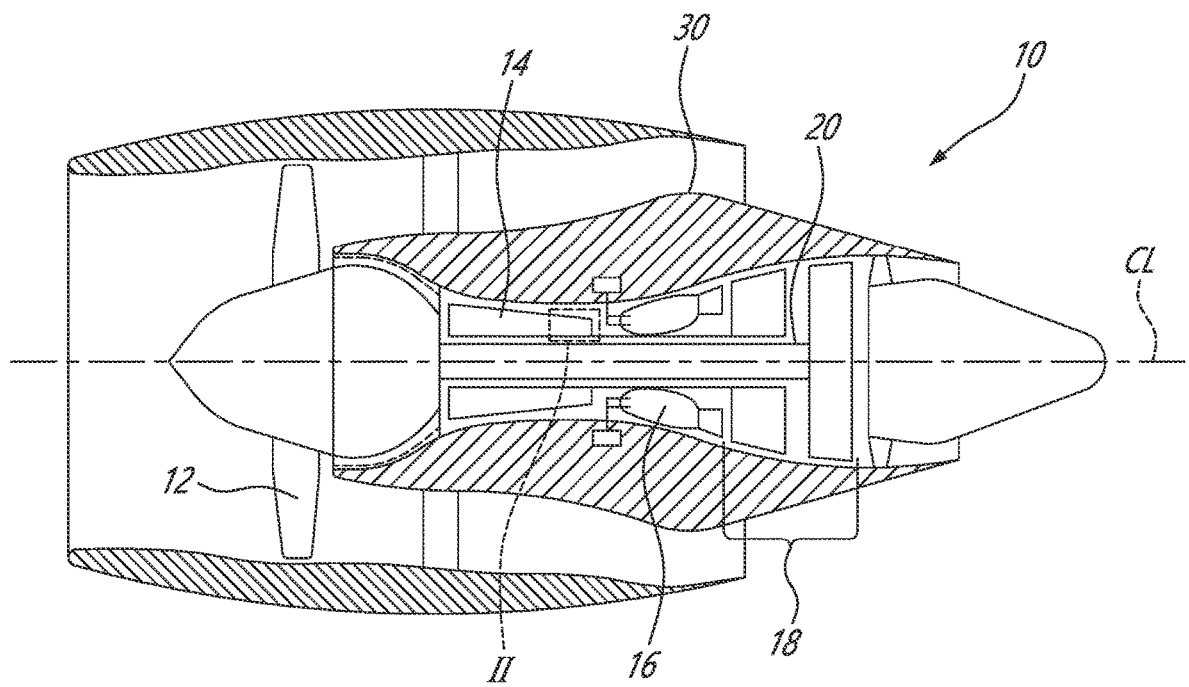
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the pressured (or compressed) air is mixed with fuel and ignited for generating an annular stream of hot combustion gases, and a turbine section 18 for extracting energy from the combustion gases. A shaft 20 of the engine 10 extends along a center line axis CL, surrounded by a casing 30. Shown at II, a high-pressure, downstream portion of the compressor section 14 is presented in FIG. 2 as one exemplary implementation of the present technology, and will be referred to henceforth as a compressor 14. The compressor 14 generally includes a stator (or shroud) 40 disposed inside the casing 30 and a rotor 50 surrounded by the stator 40.

Figure 2:
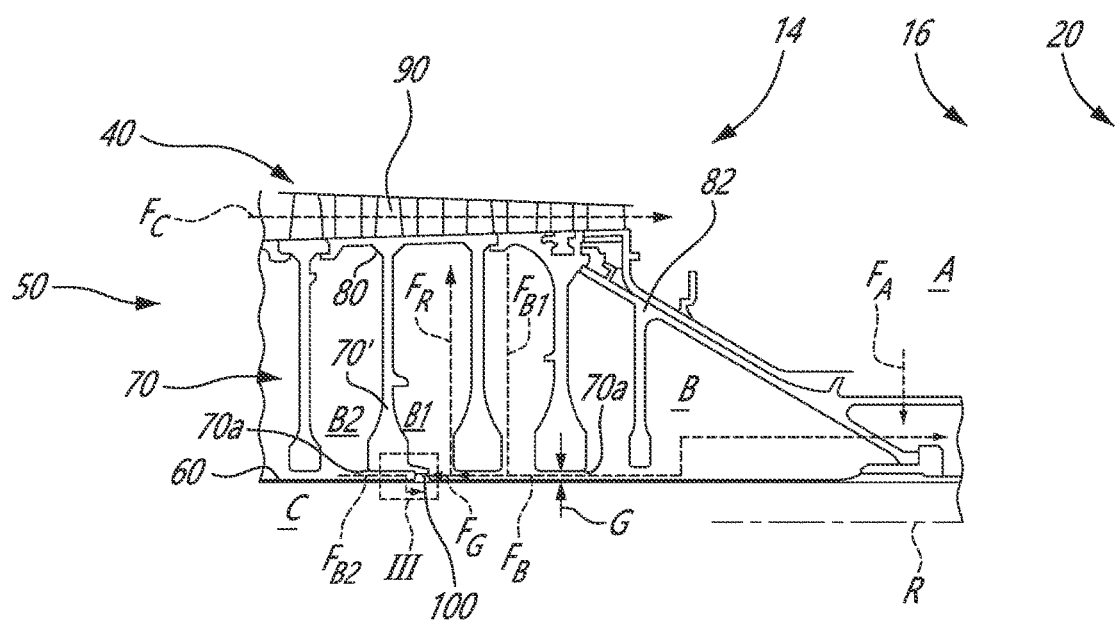
FIG. 2 is a partial schematic cross-sectional view of a compressor section of the gas turbine engine of FIG. 1.

Referring to FIG. 2, the rotor 50 includes a shaft 60 rotatable about a rotation axis R of the engine 10, in this case collinear to the center line axis CL. The rotor 50 also includes a plurality of discs 70 rotatable with the shaft 60 as the shaft 60 rotates about the axis R. Each disc discs 70 define an inner (or central) bore 70a via which the shaft 60 is received. From the bore 70a, each disc 70 extends radially outwardly relative to the axis R to a rim 80. The rim 80 is provided with radially-extending vanes 90. The discs 70 are disposed consecutively such that their respective rims 80 form an inner circumferential boundary of an axial compression flow path $F_c$ of the compressor 14, which is circumscribed outwardly by the stator 40. A hub 82 extends radially inwardly from the rim 80 of a downstream-most disc 70 to the shaft 60, separating an engine cavity A of the engine from a rotor cavity B of the rotor 50. Fore of the hub 82, the rotor cavity B extends axially to a foremost hub (not shown) of the rotor 50. Hence, the hub 82 may be referred to as rearmost (or aft) hub 82. The rotor cavity B surrounds the shaft 60 and, between the fore hub and the aft hub 82, the rotor cavity B is circumscribed outwardly by the rims 80 of the discs 70. Each disc 70 may thus be said to have a portion defined between its corresponding rim 80 and bore 70a that extends radially inwardly into the rotor cavity B. The bore 70a of each disc 70 defines a radial gap G (FIG. 3) with a corresponding portion of the shaft 60 received thereby.

A flow of air is progressively compressed along the axial compression flow path $F_c$ and routed downstream therefrom to the combustor 16. Downstream of the axial compression flow path $F_c$, the air is thus at a high pressure and also at a greater temperature due to heat radiation and hot bleeding air coming from the vicinity of the combustor 16. Such conditions may be present for example inside the engine cavity A, leading to a flow of hot, pressurized air $F_A$ flowing into the rotor 50, and to lesser degrees inside the rotor cavity B, causing further air displacement. Inside the rotor cavity B, the pressure and temperature between any two consecutive discs 70 is conversely greater the closer the discs are to the hub 82 (and to the engine cavity A). The radial gap G of each disc 70 forms a part of an axial flow path across the discs 70. The radial gap G of at least one of the discs 70 is fitted with a seal 100 arranged to block or at least hinder fluid communication across such discs 70. Such discs 70 and their corresponding seal 100 may be said to partition the rotor cavity B. One such disc is shown at 70'. A portion of the rotor cavity B located aft of the disc 70' having the seal 100 is referred to as a first cavity B1, and a portion of the rotor cavity B located fore of the disc 70' is referred to as a second cavity B2. Such cavities may be referred to as portions of a secondary air system of the engine 10. A flow of hot, pressurized air $F_{B1}$ enters the secondary air system in the rotor 50 aft of the seal 100, for instance via gaps in the inner circumferential boundary of the flow path $F_c$ located aft of the first cavity B1. By this arrangement, the rotor 50 can direct or promote a radial flow $F_R$ of hot air inside the first cavity B1, for example to heat up surrounding rims 80 and vanes 90. Fore of the seal 100, a flow of air $F_{B2}$ of cooler temperature and lower pressure relative to the flow $F_{B1}$, may form into the bore 70a, flowing axially from the second cavity B2 and radially inwardly from inside the bore 70a to an inner cavity C of the shaft 60 via openings defined in the shaft 60 fore of the seal 100. Nevertheless, the seal 100 may be said to be pressured on its fore side facing the second cavity B2. Due to the comparatively higher pressure borne by the seal 100 on its aft side facing the first cavity B1, an axial flow of hot, pressured air, referred to henceforth as a gap flow $F_G$, occurs axially from the first cavity B1 across the bore 70a of the disc 70' and the corresponding seal 100 via the gap G.

Figure 3:
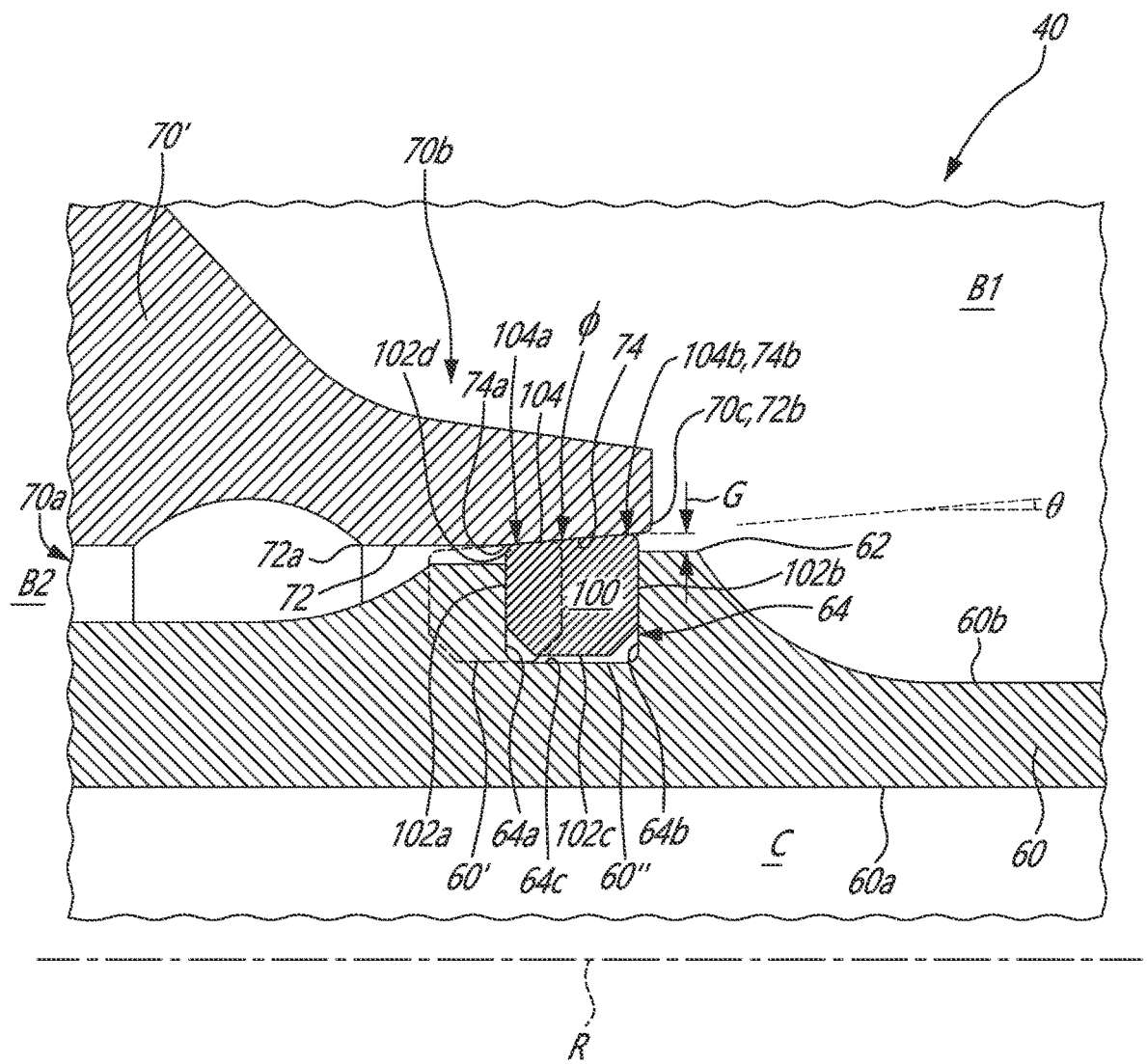
FIG. 3 is a partial cross-sectional view of a rotor of the compressor section of FIG. 2.

Turning now to FIG. 3, in accordance with an aspect of the present technology, structural characteristics of an arrangement of the shaft 60, the disc 70' and the seal 100 will now be generally described with respect to an exemplary embodiment of the rotor 50. The inner cavity C of the shaft 60 is a hollow interior surrounded by an interior shaft surface 60a of a generally cylindrical shape extending axially about a shaft axis that is coaxial with respect to the axis R. On the outside, an exterior shaft surface 60b follows the interior shaft surface 60a, albeit defining portions having different radial profiles. For instance, the exterior shaft surface 60b includes a portion referred to as an outer shaft surface 62 received by the disc bore 70a. The outer shaft surface 62 has an outer diameter that is greater than that of an aft portion of the exterior shaft surface 60b located aft of the disc 70'. The shaft 60 also includes an annular shaft groove 64 defined radially inwardly into the outer shaft surface 62. The shaft groove 64 has an axial dimension (or width) and a radial dimension (or depth) sized for receiving the seal 100, as will be described hereinbelow. The width of the shaft groove 64 is defined axially between mutually facing walls (or surfaces) 64a, 64b of the shaft groove 64, namely a fore groove wall 64a and an aft groove wall 64b. The depth of the shaft groove 64 is defined radially between the outer shaft surface 62 and a bottom groove surface 64c of the shaft groove 64.

On either side of the shaft groove 64, the outer shaft surface 62 is circumscribed by diameters of different sizes, namely by a greater diameter on an aft side of the shaft groove 64 compared to that on the opposite side. As such, the aft groove wall 64b is radially taller than the fore groove wall 64a. Conversely, the shaft groove 64 may be said to be deeper adjacent to the aft groove wall 64b than adjacent to the fore groove wall 64a. It shall be noted that the disc 70' and the shaft 60 are arranged relative to one another such that the gap G has a similar radial size immediately fore and aft of the shaft groove 64. In some implementations, the outer shaft surface 62 tapers as it extends axially toward the aft side of the shaft groove 64 and/or tapers as it extends axially away from the fore side of the shaft groove 64. In other implementations, the outer shaft surface 62 is cylindrical on either side of the shaft groove 64, i.e., circumscribed by a same size diameter. In yet other implementations, the outer shaft surface 62 is circumscribed by two different size diameters on either side of the shaft groove 64. For instance, in the depicted embodiment, the diameter on the aft side is greater than that on the fore side. A side of the shaft groove 64 circumscribed by a greater diameter may be referred to as a load-bearing side of the shaft groove 64, corresponding to a portion of the shaft 60 adapted to be axially loaded via the seal 100 as will be described hereinbelow.

On an aft side of the disc 70', a portion (or disc projection) 70b of the disc 70, inside which the bore 70a extends, projects axially. Such disc projection 70b extends to an aft disc end 70c of the disc 70'. From the aft disc end 70c, the disc 70' defines an inner disc surface 72 forming an aft portion of the bore 70a. The inner disc surface 72 extends fore relatively to the aft disc end 70c, from a nearby aft end 72b to a fore end 72a located adjacent to an annular cavity of the disc 70'. The disc projection 70b is sized and arranged relative to the shaft 60 such that the inner disc surface 72 axially overlaps the shaft groove 64, thereby circumscribing the gap G on either side of the shaft groove 64. It should be noted that in operation, the rotor 50 will exhibit some degree of geometric variability, which may occur due to thermal expansion of rotor components and/or to built-in allowances. For example, the shaft 60 and the disc 70', despite being rotatable together about the axis R, can become temporarily displaced relative to one another in either axial direction relative to the axis R, for example during take off and/or climb, or during descent and/or landing. Such axial movement occurs in a range of movement defined between a first axial position and a second axial position, here respectively represented as first 60' and second 60" axial positions of the shaft 60 relative to the disc 70'.

The inner disc surface 72 is sized to overhang the outer shaft surface 62 on either side of the shaft groove 72 such that the shaft groove 64 is surrounded by a portion of the inner disc surface 72 in each of the first and second axial positions 60', 60". Such portion of the inner disc surface 72 is a ramped disc profile 74, i.e., a shape extending radially relative to the axis R as it extends axially relative to the axis R. The ramped disc profile 74 is arranged to be cooperable with a corresponding profile of the seal 100 so as to directionally load the shaft 60 via the seal 100 in an axial loading direction upon the seal 100 extending across the gap G from inside the shaft groove 64. The ramped disc profile 74 ramps radially outwardly relative to the axis R as it extends in one axial direction relative to a central bore axis of the bore 70a (here represented by the axis R coaxial thereto), this one direction corresponding to the axial loading direction. In the present embodiment, the ramped disc profile 74 is a tapering profile which tapers at a taper angle Θ relative to the central bore axis (or axis R). The ramped disc profile 74 has fore 74a and aft ends 74b and tapers as it extends from the aft end 74b to the fore end 74a. By way of this arrangement, the axial loading direction is the aft direction. The ramped disc profile 74 can be configured such that the axial loading direction corresponds to an upstream direction, i.e., a direction away from a first cavity toward a second cavity exhibiting a positive pressure differential relative to the first cavity, as is the case for the cavity B1 relative to the cavity B2. Absent directional loading of the shaft 60 via the seal 100, the pressure differential may displace the seal 100 relative to the shaft groove 64 and to the inner disc surface 72, for example in an axial direction and/or even cocked at an angle to a radial direction relative to the axis R. Such misplacement of the seal 100 can open up circumferentially asymmetrical leakage paths outward and/or inward the seal 100, i.e., into the gap G and/or the shaft groove 64 around the seal 100. The seal 100 can be provided in the form of a split ring seal 100, i.e., an annular body having a split (or split joint) along its circumference. Near the split, the gap flow $F_G$ may exhibit singularities resulting in a circumferentially asymmetrical heat transfer along the shaft 60 on either side of the shaft groove 64, which may be further exacerbated upon the seal 100 being misplaced. Among possible outcomes, such asymmetrical flow conditions can induce thermal bowing of the shaft 60 which, in turn, may induce vibration of the rotor 50 and of other elements of the engine 10 mechanically linked thereto. Axially loading the shaft 60 via the seal 100 axially positions the seal 100 relative to the shaft groove 64 and hence relative to gap-defining surfaces of the rotor 50 nearby the shaft groove 60 such that the gap flow $F_G$ is circumferentially balanced. Axially positioning the seal 100 against either wall 64a, 64b of the shaft groove 64 loads the shaft 60. Such positioning of the seal 100 may correspond to a rated axial position of the seal 100 for a given operating condition of the engine 10 and/or a given axial position 60', 60" of the shaft 60 relative to the disc 70'.

Still referring to FIG. 3, the exemplary seal 100 has a ring-like body extending circumferentially about a ring axis and axially relative to the ring axis between fore and aft ring sides 102a, 102b. The seal 100 has an inner ring surface 102c radially inward the ring axis between the ring sides 102, 102b. An outer ring surface 102d of the seal 100 joins the ring sides 102a, 102b opposite the inner ring surface 102c. At least a portion of the outer ring surface 102d is shaped complementarily to the ramped disc profile 74 and may thus be referred to as a ramped ring profile 104 of the seal 100. Such complementarity between the ramped disc profile 74 and the ramped ring profile 104 results in the ramped disc profile 74 imparting a normal force having a radial component and an axial component onto the ramped ring profile 104 upon a radial force urging the ramped ring profile 104 radially outwardly and against the ramped disc profile 74. Stated otherwise, the disc 70' and the seal 100 are sized and arranged relative to one another such that in operation, as the engine 10 operates and the disc 70' expands radially outwardly due to a given centrifugal force and heating, the seal 100 expands radially outwardly under the given centrifugal force so as to load the ramped ring profile 104 against the ramped ring profile 74 of the disc 70'. Such loading of the ramped ring profile 104 against the ramped disc profile 74 will also occur upon the seal 100 moving axially with the shaft 60 relative to the disc 70' in a direction opposite to the axial loading direction. In implementations where the width of the shaft groove 64 is greater than that of the seal 100, the axial component of the normal force resulting from such loading of the ramped ring profile 104 against the ramped ring profile 74 will induce some axial movement of the seal 100 relative to the disc 70' in the axial loading direction, to the extent allowed by the shaft groove 64.

The ramped ring profile 104 has a shape extending radially relative to the axis R as it extends axially relative to the axis R. The ramped ring profile 104 is arranged to be cooperable with the ramped disc profile 74 so as to directionally load the shaft 60 via the seal 100 in the axial loading direction upon the seal 100 extending across the gap G from inside the shaft groove 64. The ramped ring profile 104 ramps radially outwardly relative to the axis R as it extends in the axial loading direction relative to the ring axis (here represented by the axis R coaxial thereto). In the present embodiment, the ramped ring profile 104 is a tapering profile which tapers at a taper angle relative to the ring axis (or the axis R), corresponding to the taper angle Θ of the ramp disc profile 104. The ramped ring profile 104 has fore 104a and aft ends 104b and tapers as it extends from the aft end 104b to the fore end 104a. Stated otherwise, the ramp disc profile 104 can be described as a frustoconical shape, of which the fore 104a and aft 104b ends form first and second peripheral edges. An axial distance between the fore 104a and aft 104b ends defines a ring tapering length of the ramp disc profile 104 (or of the frustoconical shape). In FIG. 3, it can be appreciated that a disc tapering length defined between the fore 74a and aft 74b ends is greater than the ring tapering length. Such difference in tapering lengths can be set to be at least equal to an axial distance between the first and second axial positions 60, 60', i.e., the range of motion of the shaft 60 with the seal 100 relative to the disc 70', such that cooperation between the seal 100 and the disc 70' can occur across the range of motion.

In this embodiment, the axial loading direction is upstream, i.e., away from the cavity B2 and toward the cavity B1, and hence toward positive pressure and temperature gradients. Configuring the axial loading direction to be upstream (or aft) as opposed to downstream (or fore) can contribute to sealing performance, in some cases mitigating the extent and/or asymmetry of the heat transfer occurring in the shaft 60 downstream of the shaft groove 64 via the gap flow $F_G$. Still, in other embodiments, the rotor 50 is arranged for the axial loading direction to be downstream.

The ring sides 102a, 102b and the inner ring surface 102c together define an inner ring shape of the seal 100 shaped complementarily to (or receivable by) the shaft groove 64. In embodiments, the inner ring shape of the seal 100 conforms to a bottom (or radially inner) shape of the shaft groove 64 such that the seal 100 may be seated into the shaft groove 64. The seal 100 has an axial dimension (or width) and a radial dimension (or thickness) sized to be receivable by the shaft groove 64. The width of the seal 100 is defined axially between mutually facing walls (or surfaces) 64a, 64b of the shaft groove 64, namely a fore groove wall 64a and an aft groove wall 64b. The thickness of the seal 100 is defined radially between the inner ring surface 102c and the outer ring surface 102d, and may be described as a difference between diameters respectively circumscribing the seal 100 inwardly and outwardly.

As mentioned hereinabove, the seal 100 can be of a split ring type in some embodiments, i.e., a construction allowing resilient, radial expansion of the seal 100 under radial loading. The seal 100 can thus be constructed of a resilient, strong and heat resistant material, such as for example metals, metallic alloys and metal matrix composites. In this embodiment, the seal 100 is expandable radially from a nominal (or baseline) diameter $\Phi$ of the seal 100. The diameter $\Phi$ corresponds to an inner disc diameter defined by the inner disc surface 72 in the ramped disc profile 74 at a location between the ends 74a, 74b, respectively defining fore and aft inner disc diameters. Upon the shaft 60 being positioned at the first axial location 60' with the seal 100 relative to the disc 70', the seal 100 is seated in the shaft groove 64 and extends radially outwardly across the gap G to the diameter $\Phi$. In the first axial position 60', the aft end 104b of the ramped ring profile 104 is circumscribed by the diameter $\Phi$. Upon the shaft 60 being positioned at the second axial location 60" with the seal 100 relative to the disc 70', the seal 100 is radially expandable to a diameter defined by the ramped disc profile 74 at a location aft of the the diameter $\Phi$, in this case the aft inner disc diameter at the aft end 74b. In the second axial position 60", the seal 100 is rotatable with the shaft 60 so as to expanded radially outwardly to the aft inner disc diameter, thereby closing the gap G. With the seal expanded to the aft inner disc diameter, moving the shaft 60 with the seal 100 from the second axial position 60" to the first axial position 60' urges the seal 100 to constrict radially to the diameter $\Phi$. Under certain circumstances, radial deformation of the disc 70' will cause the size of the bore 70a (and thus of the diameters of the inner disc surface 72) to change. Narrowing of the bore 70a may thus urge the seal 100 to constrict radially and/or to move toward the axial loading direction and, conversely, widening of the bore 70b may allow the seal 100 to radially expand and/or to move in the direction opposite to the axial loading direction. In the first axial position 60', the seal 100 is seated (or bottomed out) into the shaft groove 64. In other embodiments, the shaft groove 64 is sized so as to conform to the inner shape of the seal 100 upon the seal 100 being constricted radially to a diameter defined by the ramped disc profile 74 at a location fore of the diameter $\Phi$, such as the fore inner disc diameter at the fore end 74a. In yet other embodiments, the nominal diameter $\Phi$ of the seal 100 corresponds to the fore inner disc diameter. In other embodiments, either one or both of the ramped disc profile 74 and the ramped ring profile 104 can differ in shape, so long as a suitable geometric complementarity is provided. In some such embodiments, the ramped disc profile and the ramped ring profile can taper at slightly different angles or be locally non-congruent. Such a difference in taper angle may for example be in a range of 0.5 to 4 degrees.

Figure 4:
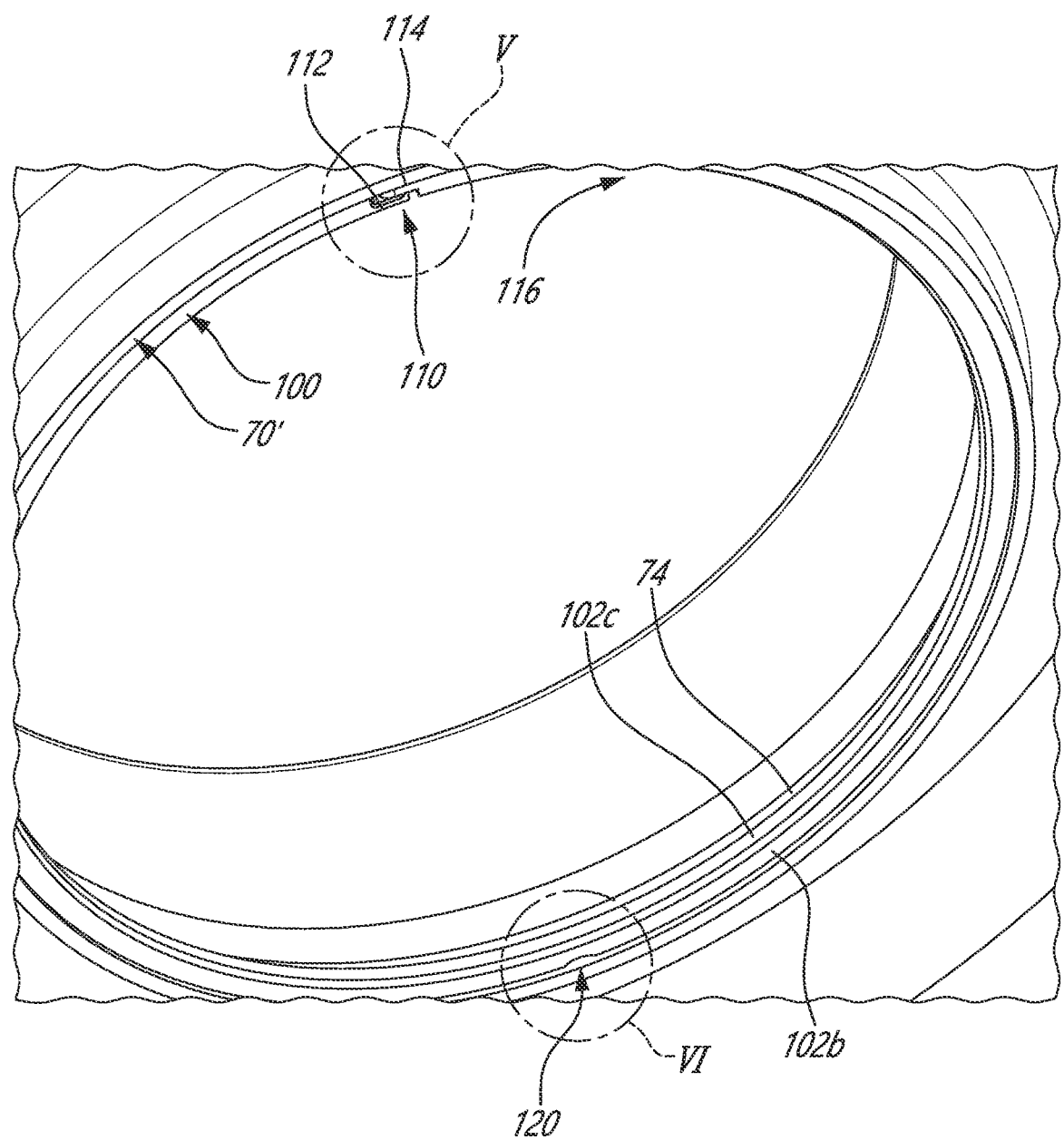
FIG. 4 is a perspective view of a disc and a seal of the rotor of FIG. 3.

With reference to FIGS. 4-7, further structural characteristics of the seal 100 will now be described. The embodiment of the seal 100 shown in FIG. 4 is of a split ring type, i.e., a seal having a split joint 110. The seal (or split ring) 100 has a pair of mutually overlapped end portions (or ends) 112, 114 together defining the split joint 110, and a ring-like arcuate portion 116 extending between the ends 112, 114. The seal 100 is also provided with a channel 120 at a location diametrically opposite to the split joint 110 along the arcuate portion 116. The channel 120 is defined into the inner ring surface 102d and extends axially through the arcuate portion 116.

The split joint 110 and the channel 120 together form a diametrically-balanced axial flow path across the seal 100 via the split joint 110 and the channel 120 upon the seal 100 conforming to a certain outer diameter. The ends 112, 114 are provided with complementary shapes being distensible to and from one another to allow the seal 100 to resiliently deform, whether by constriction or expansion. Constricting the seal 110 reduces a size of a joint flow path defined by the seal joint 110 and, conversely, expanding the seal 100 increases the size of the joint flow path. Hence, in some embodiments, the channel 120 is sized, shaped and positioned relative to the split joint 110 such that a channel flow path of the channel 120 corresponds to the joint flow path upon the seal 100 conforming to an outer diameter referred to as a graded diameter, which may be the nominal diameter $\Phi$ in certain embodiments. In other embodiments, the seal 100 is radially expandable to conform to the graded diameter. In yet other embodiments, the seal 100 is radially constrictable to conform to the graded diameter.

The seal 100 is provided with features to minimize fretting. For instance, at least some of the edges at the ends 112, 114 of the split joint 110 can be shaped (e.g., dulled, rounded off or chamfered) to mitigate stress concentration upon frictional engagement occurring with the shaft 60, the disc 70' or with an opposite one of the ends 112, 114. Likewise, as shown in FIG. 3, at least some of the edges of the seal 100 located circumferentially between the ends 112, 114 can be shaped to minimize fretting. Such edges include the edges joining the fore and aft ring sides 102a, 102b to the ramped ring surface 104, which are curved, and the edges adjacent to the inner ring surface 102c in this case being chamfered. In some implementations, the seal 100 is constructed of an inherently low-friction material selected so as to minimize fretting. The seal 100 can also be provided with a low-friction coating, for instance on portions of the seal 100 deemed prone to fretting. Likewise, suitable low-friction coating can be provided on portions of the disc bore 70a and/or portions of the shaft 60 prone to frictionally engage with the seal 100, whether in use or during assembly.

Figure 5A:
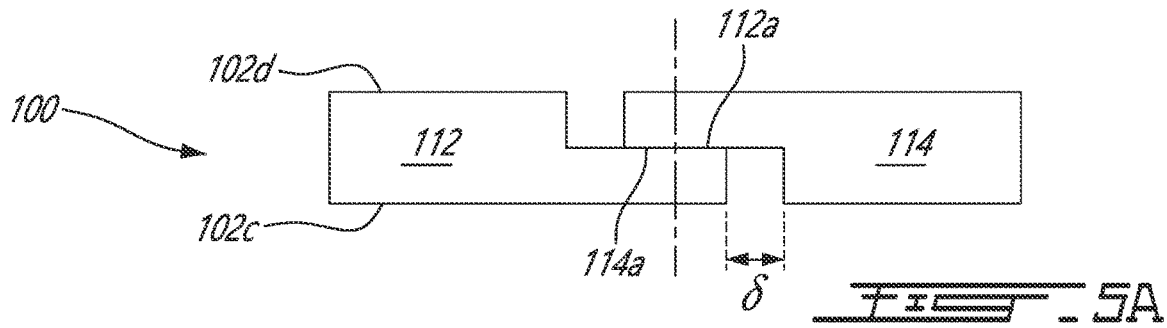
FIG. 5A is a close up view of a split joint of the seal of FIG. 4.
Figure 5B:
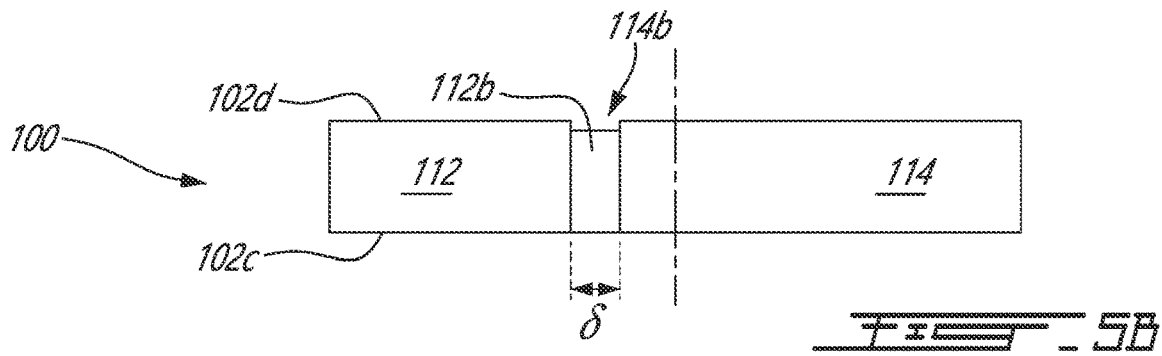
FIGS. 5B and 5C are close up views of alternate implementations of the split joint of FIG. 5A.
Figure 5C:
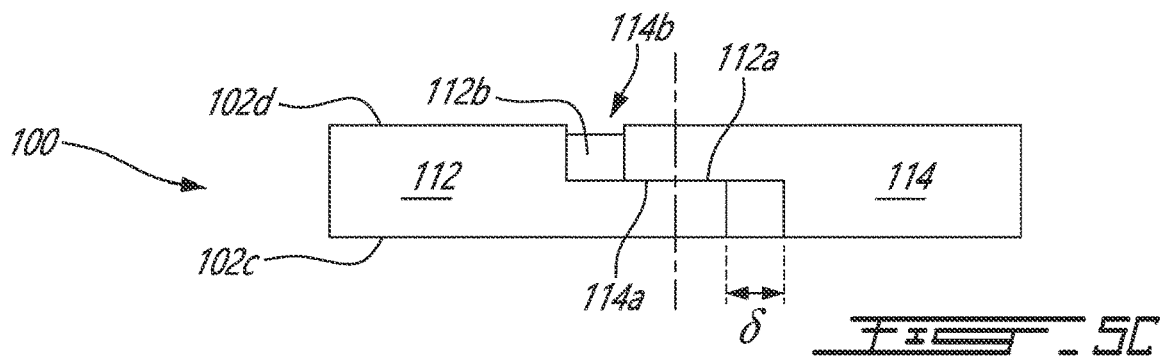
Figure 6A:
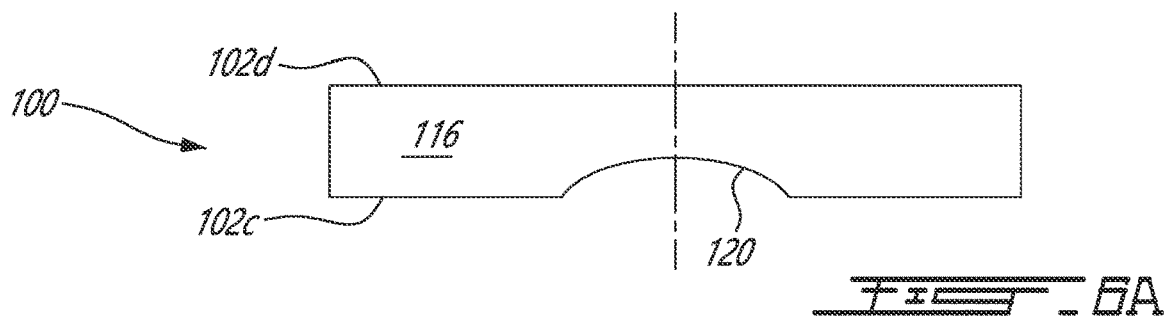
FIG. 6A is a close up view of a channel of the seal of FIG. 4.
Figure 6B:
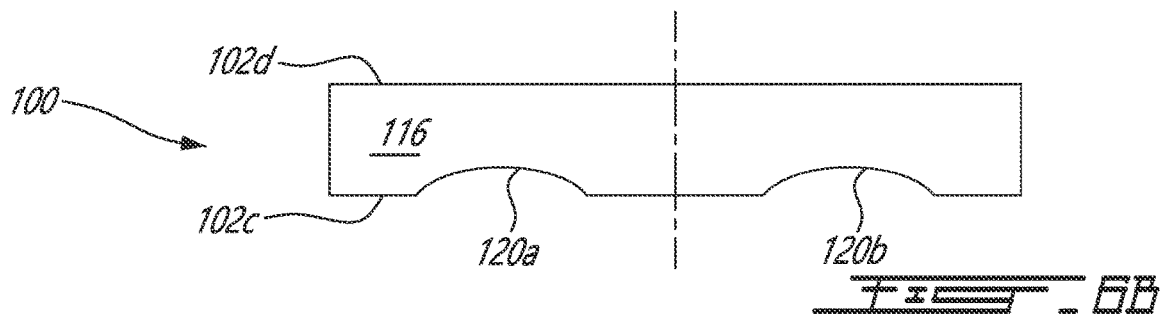
FIG. 6B is an alternate implementation of the channel of the seal of FIG. 4.

Referring to FIGS. 5A to 5C, exemplary configurations of the split joint 110 are shown. A distance δ is shown, schematically representing a distance between mutually-opposing surfaces of the ends 112, 114 upon the outer diameter of the seal 100 corresponding to the nominal diameter Φ. In some such embodiments, the seal 100 is constrictable to a narrow diameter and expandable to a wide diameter. In the depicted embodiments, the narrow diameter corresponds to the fore inner disc diameter, at which the ends 112, 114 are interlocked, with a distance therebetween being than the distance δ. The wide diameter corresponds to the aft inner disc diameter, at which the ends are spaced by a distance greater than the distance δ. In FIG. 5A, the ends 112, 114 have axially-extending overlapping surfaces 112a, 114a. In FIG. 5B, the ends 112, 114 have radially-extending overlapping surfaces 112b, 114b. In FIG. 5C, the ends 112, 114 each have axially-extending 112a, 114a and axially-extending 112b, 114b overlapping surfaces. Referring to FIGS. 6A, 6B, the channel 120 may adopt an arcuate shape, although other shapes are contemplated. As shown in FIG. 6B, the channel 120 may be formed of a plurality of openings 120a, 120b distributed along a periphery of the outer ring surface 102d. Depending on the embodiment, the shape and distribution of the openings 120a, 120b may vary. More than two openings 120a, 120b may also be provided.

Figure 7:
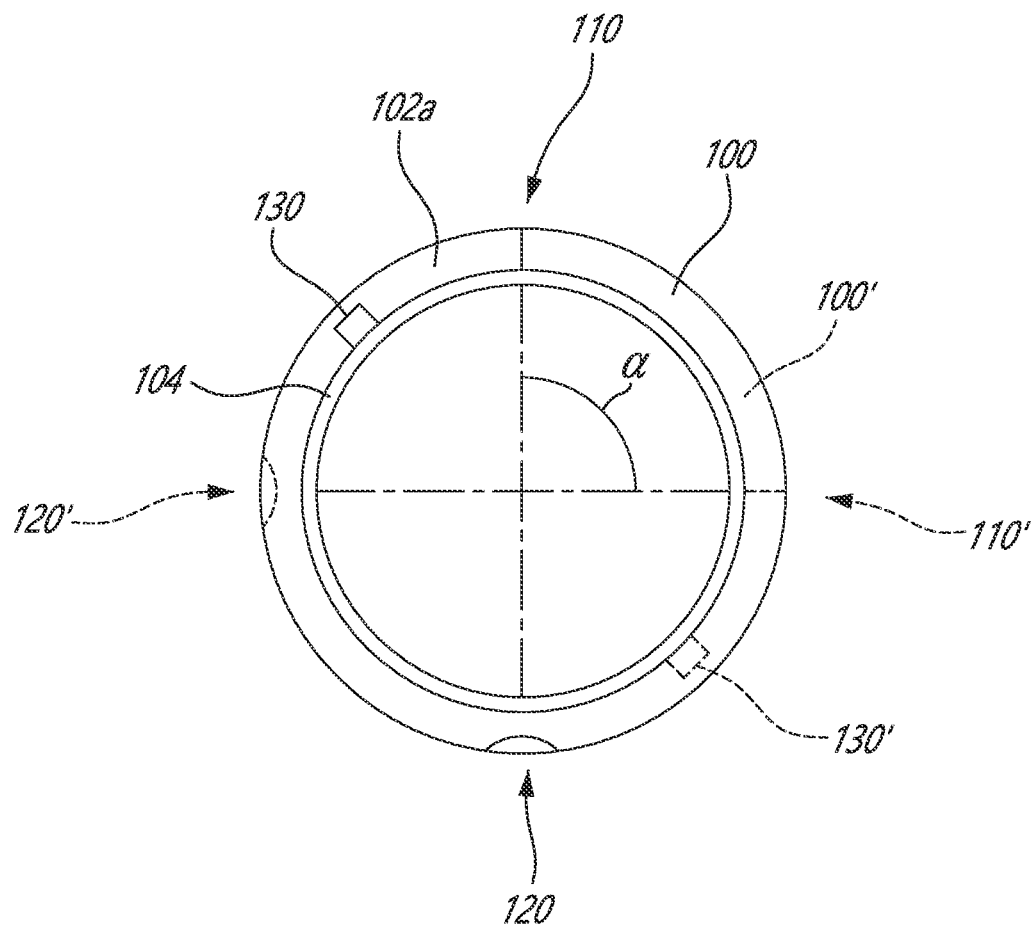
FIG. 7 is an elevation view of two seals corresponding to alternate implementations of the seal of FIG. 4 shown keyed at an angle to one another.

With reference to FIGS. 7 and 8, the rotor 50 can be provided with a plurality of seals, including at least one additional seal 100' fitted to shaft 60 at a location fore of the seal 100. In some such embodiments, the shaft 60 has a foremost shaft groove 64' located between a fore end of the outer shaft surface 62 and the shaft groove 64. The at least one seal 100' can thus be a foremost seal 100' fitted into the foremost shaft groove 64'. The seal 100 and the foremost seal 100' can be fitted in the corresponding shaft grooves 64, 64' such that they are respectively expandable into the gap G at an azimuthal angle α to one another, for example 90 degrees. Stated otherwise, the seals 100, 100' can be clocked apart to render a flow path formed across the seals 100, 100' tortuous. In this arrangement, a split joint 110' and a channel 120' of the foremost seal 100' are respectively oriented (or clocked) at the azimuthal angle α relative to the split joint 110 and the channel 120 of the seal 100. Hence, a flow path formed across the plurality of seals can be said to be indirect. In some embodiments, only one of the seal 100 and the foremost seal 100' is provided with a channel 120.

In some embodiments, one or both of the seals 100, 100' is provided with an anti-rotational feature 130, 130' cooperable with (or keyable into) a complementary anti-rotational feature 66 associated with the corresponding shaft groove 64, 64'. The anti-rotational feature 66 of each groove 64, 64' can arranged such the seals 100, 100' are at the azimuthal angle α upon keying into their corresponding shaft grooves 64, 64'.

In FIG. 8, there is shown an exemplary embodiment of the rotor 50 in which the shaft 60 is fitted with two seals 100, 100'. The shaft groove 64 is fitted with the seal 100, and the shaft 60 also has another groove 64' spaced axially relative to the groove 64 and fitted with the seal 100'. The grooves 64, 64' are respectively located proximate to an aft end and a fore end of the outer shaft surface 64, and thus may be referred to as an aft groove 64 and a foremost groove 64'. Conversely, the seals 100, 100' may be referred to as an aft seal 100 and a foremost seal 100'. The inner disc surface 72 includes a foremost ramped disc profile 74' which defines a foremost inner disc diameter close to a fore end of the inner disc surface 72. In this embodiment, the foremost ramped disc profile 74' ramps (or in this case tapers) in a direction opposite to the direction in which the (aft) ramped disc profile 74 tapers. Conversely, the foremost seal 100' has a foremost ramped ring profile 104' cooperable with the foremost ramped disc profile 74' to directionally load the shaft 60 in an axial loading direction opposite to that associated with the aft seal 100. Hence, the foremost ramped ring profile 74' tapers away from the foremost inner disc diameter. As the rotor 50 is provided with two seals 100, 100' of mutually opposite axial loading directions, the disc 70' can cooperate with either seal 100, 100' upon the shaft 60 moving axially relative to the disc 70' to axially load the shaft 60 via the one seal 100, 100' whose axial loading direction is opposite to the movement of the shaft 60. It shall be noted that during assembly, the shaft 60 is fitted with the seals 100, 100' and received therewith by the bore 70a from the aft end 70c of the disc 70'. Hence, the depth of the foremost shaft groove 64' is sized to be sufficient (or deep enough) for the seal 100' to radially collapse clear of the aft ramped disc profile 74 as the seal 100' moves axially with the shaft 60 toward the foremost ramped disc profile 74'. In this implementation, the seals 100, 100' are mirror images of one another and the foremost groove 64' is deeper than the aft groove 64, although it is contemplated that the aft groove 64 could have a matching depth.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the rotor 50 may correspond, mutatis mutandis, to any other rotor of a gas turbine engine having concentric rotor parts defining a radial gap therebetween in fluid communication between cavities of the rotor at different pressures. Such rotors may for example be in the turbine section 18 or in an accessory gearbox of the engine 10. Yet further modifications could be implemented by a person of ordinary skill in the art in view of the present disclosure, which modifications would be within the scope of the present technology.

The invention claimed is:

1. A gas turbine engine rotor assembly, comprising:
    a shaft rotatable about an axis, the shaft having an outer shaft surface radially outward relative to the axis and a shaft groove radially into the outer shaft surface;
    a disc surrounding the shaft and rotatable with the shaft about the axis, the disc having an inner disc surface extending axially and defining an inner disc diameter at an axial location of the inner disc surface, the inner disc surface having a disc tapering profile extending circumferentially around the shaft groove and axially away from and radially inwardly of the inner disc diameter, the shaft and the disc together defining a gap circumscribed outwardly by the inner disc diameter and inwardly by the outer shaft surface; and
    a seal including a split ring fitted into the shaft groove and rotatable with the shaft about the axis, the split ring having an outer ring surface having a ring tapering profile complementary to the disc tapering profile, the split ring resiliently expandable radially in the gap to the inner disc diameter,
    the disc tapering profile cooperable with the ring tapering profile to axially load the shaft via the split ring upon the split ring being expanded across the gap, and
    wherein the shaft has a plurality of shaft grooves including the shaft groove and a foremost groove located fore of the shaft groove, the seal further including a fore ring fitted into the foremost groove, the fore ring resiliently expandable radially in the gap to the inner disc surface, the split ring having a split joint and the fore ring having a fore split joint, the split ring and the fore ring respectively fitted to the shaft groove and to the foremost groove such that the split joint and the fore split joint respectively extend radially into the gap at an azimuthal angle to one another.

2. The rotor assembly of claim 1, wherein the disc tapering profile and the ring tapering profile respectively taper relative to the axis at a same taper angle.

3. The rotor assembly of claim 2, wherein the inner disc diameter is an aft inner disc diameter, the inner disc surface defining a fore inner disc diameter fore of the aft inner disc diameter, the disc tapering profile tapering from the aft inner disc diameter to the fore inner disc diameter.

4. The rotor assembly of claim 3, wherein an axial distance between the fore inner disc diameter and the aft inner disc diameter relative to the axis corresponds to a disc tapering length of the disc tapering profile, the ring tapering profile having a ring tapering length that is less than the disc tapering length.

5. The rotor assembly of claim 4, wherein the inner disc surface extends from a fore end to an aft end, an axial distance between the fore end and the fore inner disc diameter being greater than an axial distance between the aft inner disc diameter and the aft end of the inner disc surface.

6. The rotor assembly of claim 5, wherein the fore ring is resiliently expandable radially in the gap to a foremost inner disc diameter defined by the inner disc surface between the fore end of the inner disc surface and the fore inner disc diameter.

7. The rotor assembly of claim 6, wherein the inner disc surface has a foremost disc tapering profile tapering away from the foremost inner disc diameter.

8. A seal for a rotor disc of a gas turbine engine, comprising:
a split ring including a pair of mutually overlapped end portions together defining a split joint and an arcuate portion extending circumferentially about an axis from a first end of the end portions to a second end of the end portions, the arcuate portion having:
first and second sides facing axially away from one another relative to the axis;
an outer ring surface joining the first and second sides, the outer ring surface having a frustoconical shape circumscribed by a first peripheral edge proximate to the first side and by a second peripheral edge proximate to the second side, the second peripheral edge being longer than the first peripheral edge;
an inner ring surface facing radially inwardly relative to the axis and extending axially between the first and second sides, and
a channel defined into the inner ring surface at a location diametrically opposite to the split joint, the channel extending axially through the arcuate portion;
the split ring resiliently expandable radially outwardly under centrifugal force relative to the axis to distance the end portions.

9. The seal of claim 8, wherein the split joint and the channel together form a diametrically-balanced axial flow path across the split ring via the split joint and the channel upon the split ring conforming to an outer diameter corresponding to a diameter defined by the frustoconical shape.

10. A gas turbine engine, comprising:
a shaft rotatable about an axis, the shaft having an outer shaft surface radially outward relative to the axis and a shaft groove radially into the outer shaft surface;
a disc surrounding the shaft and rotatable with the shaft about the axis, the disc having an inner disc surface extending axially and defining an inner disc diameter at an axial location of the inner disc surface, the inner disc surface having a ramped disc profile extending circumferentially around the shaft groove and axially away from and radially inwardly of the inner disc diameter, the shaft and the disc together defining a gap circumscribed outwardly by the inner disc diameter and inwardly by the outer shaft surface; and
a seal including a split ring fitted into the shaft groove and rotatable with the shaft about the axis, the split ring having an outer ring surface having a ramped ring profile complementary to the ramped disc profile, the split ring resiliently expandable radially in the gap to the inner disc diameter, wherein the split ring has a split joint and a channeled portion located diametrically opposite the split joint, the split joint and the channelled portion together defining a diametrically-balanced axial flow path,
the ramped disc profile cooperable with the ramped ring profile to axially load the shaft via the split ring upon the split ring being expanded across the gap.

11. The gas turbine engine of claim 10, wherein the split ring is sized to extend radially from inside the shaft groove to across the gap upon being expanded to the inner disc diameter.

12. The gas turbine engine of claim 10, wherein the ramped disc profile and the ramped ring profile are complementary tapered profiles.

13. The gas turbine engine of claim 10, wherein the ramped disc profile is cooperable with the ramped ring profile to load the shaft axially upon the split ring being expanded across the gap.

14. The gas turbine engine of claim 10, including a compressor section having a rotor assembly rotatable about the axis, the rotor assembly including the shaft, the disc and the split ring, the compressor section defining a fore compressor chamber fore of the disc and an aft compressor chamber aft of the disc, the gap in fluid communication between the fore and aft chambers.

15. The gas turbine engine of claim 14, wherein the inner disc diameter is an aft inner disc diameter, the inner disc surface defining a fore inner disc diameter located fore of the aft inner disc diameter relative to the axis, the ramped disc profile extending from the fore inner disc diameter to the aft inner disc diameter, the aft inner disc diameter being greater than the fore inner disc diameter.

16. The gas turbine engine of claim 14, wherein the ramped disc profile is cooperable with the ramped ring profile to oppose a pressure differential exerted on the split ring upon the split ring being expanded across the gap, the pressure differential corresponding to a difference between an aft pressure in the aft compressor chamber and a fore pressure in the fore compressor chamber.

17. The gas turbine engine of claim 10, wherein the inner disc diameter is a wide inner disc diameter, the inner disc surface defining a narrow inner disc diameter narrower than the wide inner disc diameter and spaced axially from the wide inner disc diameter relative to the axis, the shaft axially displaceable with the split ring relative to the inner disc surface between a first axial position corresponding to the narrow inner disc diameter and a second axial position corresponding to the wide inner disc diameter, the split ring expandable radially outwardly from the narrow inner disc diameter to the wide inner disc diameter to close the gap at either position between the first axial position and the second axial position.

18. The gas turbine engine of claim 10, wherein the split ring is an aft split ring of a plurality of split rings of the gas turbine engine, the plurality of split rings including a fore split ring disposed fore of the aft split ring, the aft split ring and the fore split ring respectively having an aft split joint and a fore split joint, the aft split ring and the fore split joint respectively keyed to the shaft such that the aft and fore split joints are at an azimuthal angle to one another.

\* \* \* \* \*